United States Patent
Malet et al.

(10) Patent No.: US 9,914,804 B2
(45) Date of Patent: Mar. 13, 2018

(54) METHOD FOR SYNTHESISING A BLOCK COPOLYMER ALLOY HAVING IMPROVED ANTISTATIC PROPERTIES

(75) Inventors: Frederic Malet, Rouen (FR); Eric Gamache, Philadelphia, PA (US); Perrine Babin, Rouen (FR); Benoit Andre, Evreux (FR); Michael Werth, Bernay (FR)

(73) Assignee: ARKEMA FRANCE, Colombes (FR)

( * ) Notice: Subject to any disclaimer, the term of this patent is extended or adjusted under 35 U.S.C. 154(b) by 461 days.

(21) Appl. No.: 13/147,505

(22) PCT Filed: Feb. 2, 2010

(86) PCT No.: PCT/FR2010/050164
§ 371 (c)(1),
(2), (4) Date: Dec. 20, 2011

(87) PCT Pub. No.: WO2010/086574
PCT Pub. Date: Aug. 5, 2010

(65) Prior Publication Data
US 2012/0108694 A1    May 3, 2012

(30) Foreign Application Priority Data
Feb. 2, 2009 (FR) ...................... 09 50637

(51) Int. Cl.
| | |
|---|---|
| C08G 69/40 | (2006.01) |
| C08L 87/00 | (2006.01) |
| C08L 101/00 | (2006.01) |
| C08K 5/00 | (2006.01) |
| C08L 77/12 | (2006.01) |

(52) U.S. Cl.
CPC ............ *C08G 69/40* (2013.01); *C08L 87/005* (2013.01); *C08L 101/00* (2013.01); *C08K 5/0075* (2013.01); *C08L 77/12* (2013.01)

(58) Field of Classification Search
CPC ....... C08L 77/06; C08L 67/025; C08G 69/04; C08G 69/26; C08G 69/28; C08G 69/40; C08K 5/31; C08K 5/3415; C08K 5/3432; C08K 5/49; C08K 5/53; C08K 5/55; C08K 2201/017
USPC .... 525/420, 430; 524/86, 99, 104, 106, 157, 524/158, 167, 170, 183
See application file for complete search history.

(56) References Cited

U.S. PATENT DOCUMENTS

| | | | |
|---|---|---|---|
| 6,506,830 B1 * | 1/2003 | Bussi et al. | 524/495 |
| 7,192,538 B2 | 3/2007 | Fujihana et al. | |
| 2002/0137825 A1 * | 9/2002 | Lamanna et al. | 524/243 |
| 2005/0090588 A1 * | 4/2005 | Suzuki | 524/147 |
| 2009/0030122 A1 | 1/2009 | Matsuda et al. | |
| 2009/0264601 A1 * | 10/2009 | Blondel et al. | 525/420 |

FOREIGN PATENT DOCUMENTS

| | | |
|---|---|---|
| EP | 1 273 629 | 1/2003 |
| JP | 7 145 368 | 6/1995 |
| JP | 2002 146212 | 5/2002 |
| JP | 2004 217931 | 8/2004 |
| JP | 2008 274029 | 11/2008 |
| JP | 2008 297418 | 12/2008 |
| WO | WO 2008006987 A1 * | 1/2008 |

OTHER PUBLICATIONS

Kubisa, P., Progress in Polymer Science, vol. 34, 2009, p. 1333-1347.*
International Search Report for PCT/FR2010/050164 dated Apr. 10, 2010.
Lozinskaya, E. I. et al., "Direct polycondensation in ionic liquids," European Polymer Journal, 2004, vol. 40, pp. 2065-2075.
Mallakpour, S. et al., "Ionic liquid catalyzed synthesis of organosoluble wholly aromatic optically active polyamides," Polym Bull., 2009, vol. 62, pp. 605-614.
Mallakpour, S. et al., "Use of ionic liquid and microwave irradiation as a convenient, rapid and eco-friendly method for synthesis of novel optically active and thermally stable aromatic polyamides containing N-phthaloyl-$_L$-alanine pendent group," Polymer Degradation and Stability, 2008, vol. 93, pp. 753-759.
Sanyo Chem Ind Ltd., "Antistatic agent and antistatic resin composition," Patent Abstract of Japan, Publication Date: Aug. 5, 2004; English Abstract of JP-2004 217931.

(Continued)

*Primary Examiner* — Robert Jones
(74) *Attorney, Agent, or Firm* — Millen White Zelano & Branigan

(57) ABSTRACT

The invention relates to a method for synthesising a block copolymer alloy including at least one rigid polyamide block PA, including the steps of: a) producing said block copolymer; b) adding, during step a) and to at least a portion of said block copolymer, 0.1 to 30 wt % of at least one organic salt in the molten state relative to the total weight of the alloy, so that the alloy thus obtained has improved antistatic properties and identical mechanical properties when compared to the same polymer produced without adding an organic salt. The invention also relates to a block copolymer alloy having improved antistatic properties and obtained by said method, to the use thereof in a polymer matrix, and to a composition containing same.

7 Claims, No Drawings

(56) References Cited

OTHER PUBLICATIONS

Sanyo Chem Ind Ltd., "Antistatic agent and antistatic resin composition," Patent Abstract of Japan, Publication Date: Dec. 11, 2008; English Abstract of JP-2008 297418.

Sanyo Chem Ind Ltd., "Antistatic agent and resin composition incorporating the same," Patent Abstracts of Japan, Publication Date: May 22, 2002; English Abstract of JP-2002 146212.

Sanyo Chem Ind Ltd., "Antistatic Agent," Patent Abstracts of Japan, Publication Date: Jun. 6, 1995, English Abstract of JP-07-145368.

Sanyo Chem Ind Ltd., "Antistatic Resin," Patent Abstract of Japan, Publication Date: Nov. 13, 2008; English Abstract of JP-2008 274029.

\* cited by examiner

METHOD FOR SYNTHESISING A BLOCK COPOLYMER ALLOY HAVING IMPROVED ANTISTATIC PROPERTIES

FIELD OF THE INVENTION

The present invention relates to thermoplastic elastomer polymers (abbreviation TPE), and in particular the technical polymers of high added value used in various sectors, such as electronics, the automobile industry or sporting goods. The present invention relates more particularly to the thermoplastic elastomer polymer materials comprising at least one polyamide block, such as copolymers comprising polyether blocks and polyamide blocks (PEBA), and having improved antistatic properties. A subject of the invention is also a novel process for obtaining such thermoplastic elastomers having improved antistatic properties, and the use thereof in any type of thermoplastic polymer matrix in order to provide this matrix with antistatic properties.

The term "thermoplastic elastic polymer (TPE)" is intended to mean a block copolymer comprising alternating blocks or segments termed hard or rigid (with a rather thermoplastic behavior) and blocks or segments termed soft or flexible (with a rather elastomeric behavior).

In the remainder of the text, the expression "alloy based on a thermoplastic elastomer comprising polyamide blocks" or "alloy based on a polyamide-based thermoplastic elastomer" or alternatively "alloy based on a block copolymer comprising at least one rigid polyamide block" is intended to mean any polymer material composed of more than 50% by weight, preferably at least 70% by weight, of at least one block copolymer comprising at least one polyamide (homopolyamide or copolyamide) block. A thermoplastic elastomer comprising at least one polyamide block is hereinafter abbreviated to TPE-A; and an alloy based on a thermoplastic elastomer comprising polyamide is hereinafter abbreviated to "TPE-A alloy". Such an alloy may also comprise any other polymer other than a TPE-A, but also fillers, additives, adjuvants, plasticizers, and/or any other component, which may or may not be compatible, commonly used in polymer materials.

The term "thermoplastic polymer matrix" is intended to mean any thermoplastic polymer material capable of incorporating a TPE-A alloy according to the invention. The thermoplastic polymers are well known to those skilled in the art and comprise in particular polyolefins (polyethylene, polypropylene, etc.), polyvinyl chloride, polyethylene terephthalate, polystyrene, polyamides and acrylics.

The antistatic property of a polymer is mainly characterized by its surface resistivity which is expressed in ohms/square and measured according to standard ASTM D257. The expression "TPE-A alloy having improved antistatic properties" is intended to mean a decrease by at least a factor of 10 (in ohms/square) in the surface resistivity of said TPE-A alloy by virtue of the synthesis process according to the invention.

PRIOR ART

The formation and retention of static electricity charges at the surface of most plastics are known. For example, the presence of static electricity on thermoplastic films causes these films to stick to one another, making it difficult to separate them. The presence of static electricity on packaging films can cause the accumulation of dust on the objects to be packaged and thus impair their use. Static electricity can also damage microprocessors or components of electronic circuits. Static electricity can also cause the combustion or explosion of inflammable materials such as, for example, expandable polystyrene beads which contain pentane.

Antistatic agents for polymers are described in the prior art. They are generally ionic surfactants of the ethoxylated amine or sulfonate type which are added to the polymers. However, the antistatic properties of the polymers incorporating these surfactants depend on the ambient humidity and they are not therefore permanent. This is because these surfactants have a tendency to migrate to the surface of the polymers and then to disappear.

Copolymers comprising polyamide blocks and hydrophilic blocks form other antistatic agents which have the advantage of not migrating. Their antistatic properties are permanent and independent of the ambient humidity. Mention may in particular be made of patents JP60023435 A, EP242158, WO0110951, EP1046675 and EP829520, which describe polymer substrates made antistatic by adding a copolymer comprising polyether blocks and polyamide blocks to their composition.

More recently, antistatic polymer compositions have been produced by mixing a polymer with ionic liquid. The existing processes for preparing a polymer-based antistatic material are carried out in two steps: synthesis of the polymer and then incorporation of ionic liquid into said already formed polymer.

Sanyo patent JP2004217931 describes an antistatic composition obtained by mixing or kneading a polyether block copolymer with an ionic liquid. Said ionic liquid has a conductivity included in the range of from 1 to 200 mS/cm and a melting point below ambient temperature, and said block polymer has a water absorption included in the range of from 10% to 150%, which excludes the use of polymers with a low water uptake in these antistatic compositions. This type of mixing of an ionic liquid with a polymer by kneading or shearing (in particular by calendaring or extrusion, etc.) is an energy-expensive step which is capable of impairing the mechanical properties of the polymer with which ionic liquid is mixed.

Patent EP1519988 describes a polymer composition which comprises an ionic liquid having the role of a plasticizer. One of the processes described in this application comprises bringing an existing polymer into contact with an ionic liquid. In said application, the addition of ionic liquid leads to a decrease in the glass transition temperature (Tg) of the polymer obtained, and therefore an impairment of its physicochemical and mechanical properties. The polymer to which ionic liquid is thus added is then rendered unusable for applications where these mechanical properties are required.

Over the past ten years, TPEs, such as the materials sold by the group Arkema under the trade mark Pebax®, have gradually spread in the field of electronic components by virtue of their mechanical properties and in particular their property of exceptional elastic springback. In applications of this type, the parts must be able to withstand both a high pressure and a high temperature so as not to risk being damaged, spoiled or deformed, nor to have their mechanical properties modified.

The objective of the present invention is therefore to provide a process for producing such a TPE-A-based material having improved antistatic properties, which is easy to implement, which does not have the drawbacks of the prior art, which has as few steps as possible, and which does not excessively modify the mechanical properties of the TPE-A.

The objective of the present invention is also to provide a TPE-A material having permanent antistatic properties, which is ready to use and which improves the antistatic properties of the polymer matrices which incorporate it.

The applicant has demonstrated, surprisingly, that the addition of at least one organic salt, such as an ionic liquid, directly during the polymerization during the synthesis of a TPE-A, makes it possible to obtain a TPE-A-based alloy having improved and permanent antistatic properties, or even accelerates the polymerization kinetics, while at the same time not impairing the mechanical properties of the TPE-A obtained.

SUMMARY OF THE INVENTION

The subject of the present invention is therefore a process for synthesizing an alloy based on a block copolymer comprising at least one rigid polyamide block PA, said process comprising:
a)—producing said block copolymer;
b)—adding, during step a), to at least one portion of the block copolymer, from 0.1% to 30% by weight of at least one organic salt in the molten state, relative to the total weight of alloy;
such that the alloy obtained has improved antistatic properties and identical mechanical properties compared with the same copolymer produced without adding an organic salt.

Advantageously, said at least one organic salt comprises at least one cation comprising at least one of the following molecules: ammonium, sulfonium, pyridinium, pyrrolidinium, imidazolium, imidazolinium, phosphonium, lithium, guanidinium, piperidinium, thiazolium, triazolium, oxazolium, pyrazolium, and mixtures thereof.

Advantageously, said at least one organic salt comprises at least one anion comprising at least one of the following molecules: imides, in particular bis(trifluoromethanesulfonyl)imide; borates, in particular tetrafluoroborate; phosphates, in particular hexafluorophosphate; phosphinates and phosphonates, in particular alkyl phosphonates; amides, in particular dicyanamide; aluminates, in particular tetrachloroaluminate; halides, such as bromide, chloride or iodide anions; cyanates; acetates, in particular trifluoroacetate; sulfonates, in particular methanesulfonate or trifluoromethanesulfonate; sulfates, in particular hydrogen sulfate; and mixtures thereof.

Advantageously, said synthesis process comprises the following steps:
  I—production of at least one polyamide block PA;
  II—polycondensation of at least one soft block SB having a glass transition temperature Tg of less than 15° C., with said at least one polyamide block PA so as to obtain a block copolymer; and
  III—recovery of said block copolymer alloy.

Preferably, said at least one organic salt has a melting point below the temperature of the step of said synthesis process during which it is added. Preferably, said at least one organic salt has a melting point below 300° C., preferably below 200° C., preferably below 100° C., and advantageously constitutes an ionic liquid, preferably below 30° C.

Preferably, the organic salt is in liquid form at atmospheric temperature and pressure.

Advantageously, said step I comprises the polycondensation of polyamide precursors in the presence of a chain regulator.

Preferably, said step I comprises the following substeps:
  (I-1) charging a mixture comprising at least one PA precursor and at least one chain regulator to a reactor;
  (I-2) a phase of heating said mixture to a temperature included in the range of from 180 to 350° C., preferably from 200 to 300° C., preferably from 230 to 290° C.;
  (I-3) a hot isothermal phase, during which the temperature of the mixture is kept constant, included in the range of from 180 to 350° C., preferably from 200 to 300° C., preferably from 230 to 290° C., for a period of time sufficient to bring the mixture introduced in I-1 to a viscosity that is sufficiently low to have a homogeneous mixture;
  (I-4) a phase of eliminating water, by expansion (decrease in pressure) of said mixture during which the mixture returns to atmospheric pressure and/or by distillation;
  (I-5) sweeping under an inert gas until complete polymerization of the mixture in the form of polyamide blocks.

Advantageously, step I also comprises one or more of the following substeps:
  (I-6) an optional step of maintaining under reduced pressure in order to increase the polymerization yield if necessary, said pressure preferably being less than 500 mbar, preferably less than 100 mbar;
  (I-7) an optional step of recovering the PA blocks.

Preferably, said step II comprises the following substeps:
  (II-1) bringing at least one part of the amount of at least one soft block SB into contact, in a reactor, with the PA blocks formed in step I, and adjusting the temperature of the mixture so as to make the mixture homogeneous, said temperature preferably being included in the range of from 180 to 350° C., preferably from 200 to 300° C., preferably from 200 to 260° C.

Advantageously, step II also comprises one or more of the following substeps:
  (II-2) an optional step of sweeping with an inert gas and/or placing under slightly reduced pressure so as to eliminate the water which forms in the reactor during the copolymerization, said pressure preferably being less than 500 mbar, preferably less than 100 mbar;
  (II-3) an optional step of introducing the remaining part of said at least one SB block where appropriate.

Preferably, said step III comprises the following substeps:
  (III-1) adjustment of the viscosity of the copolymer alloy obtained until the desired viscosity for the alloy is reached, the reactor being subjected to a pressure of less than 100 mbar, preferably less than 50 mbar, preferably less than 10 mbar, more preferably less than 1 mbar;
  (III-2) extrusion and recovery of the block copolymer;
  (III-3) an optional step of stoving the granules so as to reduce the residual water content below 0.1% by weight.

According to one embodiment, steps I and II are carried out successively.

According to a second embodiment, steps I and II are carried out simultaneously. This second embodiment is preferred.

Advantageously, said at least one organic salt is incorporated during step I, II and/or III.

Advantageously, said at least one organic salt is incorporated during step II, which makes it possible to accelerate the block copolymer polymerization kinetics. Advantageously, the process described above also comprises the addition of agents which improve the surface conductivity, during step I, II and/or III, said agents being chosen from: hygroscopic agents; fatty acids; lubricants; metals; metal film coatings; metal powders; metal nanopowders; aluminosilicates; amines, such as quaternary amines; esters; fibers; carbon black; carbon fibers; carbon nanotubes; polyethylene glycol; intrinsically conductive polymers, such as derivatives of polyanaline, of polythiophene or of polypyrrole; masterbatches; and mixtures thereof.

Advantageously, said process also comprises the addition of additives and/or adjuvants during step I, II and/or III, said additives and/or adjuvants being chosen from: organic or inorganic fillers, reinforcing agents, plasticizers, stabilizers, antioxidants, anti-UV agents, flame retardants, carbon black, carbon nanotubes; mineral or organic dyes, pigments, dyes, demolding agents, lubricants, foaming agents, anti-impact agents, shrink-proofing agents, fire retardants, nucleating agents, and mixtures thereof.

A subject of the present invention is also a block copolymer alloy having improved antistatic properties, comprising at least one rigid polyamide block and at least one soft block, which can be obtained by means of the synthesis process described above, said alloy incorporating from 0.1% to 30% by weight of at least one organic salt, relative to the total weight of the alloy.

Preferably, said alloy incorporates from 0.1% to 20%, preferably from 0.1% to 5% by weight of at least one organic salt, relative to the total weight of the alloy.

Advantageously, the proportion by weight of said at least one rigid polyamide block represents from 5% to 95%, preferably from 15% to 95%; and the proportion by weight of said at least one flexible block represents from 5% to 95%, preferably from 5% to 85%, relative to the total weight of copolymer.

Advantageously, said at least one rigid block and/or said at least one soft block are at least partially derived from renewable starting materials.

Preferably, said at least one rigid polyamide block and/or said at least one soft block is (are) totally derived from renewable materials.

Advantageously, said alloy has a biocarbon content of at least 1%, which corresponds to a $^{14}C/^{12}C$ isotope ratio of at least $1.2 \times 10^{-14}$.

Advantageously, the biocarbon content of said alloy is greater than 5%, preferably greater than 10%, preferably greater than 25%, preferably greater than 50%, preferably greater than 75%, preferably greater than 90%, preferably greater than 95%, preferably greater than 98%, preferably greater than 99%, or better still substantially equal to 100%.

Advantageously, said at least one polyamide block comprises at least one of the following molecules: PA12, PA11, PA10.10, PA6, PA6/12, a copolyamide comprising at least one of the following monomers: 11, 5.4, 5.9, 5.10, 5.12, 5.13, 5.14, 5.16, 5.18, 5.36, 6.4, 6.9, 6.10, 6.12, 6.13, 6.14, 6.16, 6.18, 6.36, 10.4, 10.9, 10.10, 10.12, 10.13, 10.14, 10.16, 10.18, 10.36, 10.T, 12.4, 12.9, 12.10, 12.12, 12.13, 12.14, 12.16, 12.18, 12.36, 12.T, and mixtures or copolymers thereof.

Advantageously, said at least one soft block is chosen from polyether blocks; polyester blocks; polysiloxane blocks, such as polydimethylsiloxane blocks; polyolefin blocks; polycarbonate blocks; and mixtures thereof or random or block copolymers thereof.

Advantageously, said copolymer alloy comprises at least one polyether block comprising at least 50% by weight of polyethylene glycol PEG, relative to the total weight of polyether block(s).

Advantageously, the total PEG content is at least 35% by weight, preferably at least 50% by weight, relative to the total weight of the alloy.

Advantageously, said alloy comprises at least one rigid polyamide block and at least one soft block chosen from polyether blocks; polyester blocks; polysiloxane blocks, such as polydimethylsiloxane blocks; polyolefin blocks; polycarbonate blocks; and mixtures thereof; in which the total polyethylene glycol PEG content is at least 35% by weight, relative to the total weight of the alloy, said alloy incorporating from 0.1% to 30% by weight of at least one organic salt, relative to the total weight of the alloy.

Advantageously, the proportion by weight of said at least one rigid polyamide block represents from 5% to 65%, and the proportion by weight of said at least one soft block represents from 35% to 95%, preferably from 35% to 85%, relative to the total weight of the copolymer.

Advantageously, said copolymer comprises a PEBA.

Preferably, said PEBA comprises PA12-PEG, PA6-PEG, PA6/12-PEG, PA11-PEG, PA12-PTMG, PA6-PTMG, PA6/12-PTMG, PA11-PTMG, PA12-PEG/PPG, PA6-PEG/PPG, PA6/12-PEG/PPG, PA11-PEG/PPG, PA12-PPG/PTMG, PA6-PPG/PTMG, PA6/12-PPG/PTMG and/or PA11-PPG/PTMG. In the latter examples, polyether 1/polyether 2 represents a random or block copolymer.

Advantageously, the copolymer is a segmented block copolymer comprising three different types of blocks, said copolymer being chosen from copolyetheresteramides and copolyetheramideurethanes, in which:
  the percentage by weight of rigid polyamide block is greater than 10%;
  the percentage by weight of soft block is greater than 20%;
relative to the total weight of copolymer.

A subject of the present invention is also a composition comprising a copolymer alloy as defined above, said alloy representing, by weight, from 5% to 100%, preferably from 5% to 70%, preferably from 5% to 30%, relative to the total weight of the composition.

A subject of the present invention is also the use of such a block copolymer alloy or of such a composition, in a thermoplastic polymer matrix for improving the antistatic properties of said matrix.

Advantageously, said polymer matrix comprises at least one thermoplastic polymer, which is a homopolymer or copolymer, chosen from: polyolefins, polyamides, fluoropolymers, saturated polyesters, polycarbonate, styrene resins, PMMA, thermoplastic polyurethanes (TPUs), copolymers of ethylene and vinyl acetate (EVA), copolymers comprising polyamide blocks and polyether blocks, copolymers comprising polyester blocks and polyether blocks, copolymers comprising polyamide blocks, comprising polyether blocks and comprising polyester blocks, copolymers of ethylene and an alkyl (meth)acrylate, copolymers of ethylene and vinyl alcohol (EVOH), of ABS, of SAN, of ASA, of polyacetyl, polyketones, and mixtures thereof. Mention may in particular be made of PC-ABS and PC-ASA resins.

Advantageously, the composition according to the invention comprises from 1% to 40% by weight of at least one block copolymer alloy as defined above and from 60% to 99% by weight of a polymer matrix as defined above, preferably from 10% to 30% by weight of at least one block copolymer according to the invention and from 70% to 90% by weight of such a polymer matrix.

DETAILED DESCRIPTION OF THE INVENTION

A subject of the present invention is therefore a process for synthesizing an alloy based on a polyamide-based block copolymer (TPE-A), in which at least one organic salt is introduced during said synthesis, such that the copolymer alloy obtained has improved antistatic properties and identical mechanical properties compared with the properties of the same copolymer synthesized without organic salt.

The organic salts are salts consisting of organic cations associated with inorganic or organic anions.

According to the present invention, said at least one organic salt is added to at least one portion of the block copolymer according to a content ranging from 0.1% to 30% by weight, relative to the total weight of alloy.

According to the present invention, said at least one organic salt is added in the molten state, i.e. when the organic salt is at a temperature above its melting point. In the process of the invention, said at least one organic salt has a melting point below the temperature of the step of said synthesis process during which it is added.

Preferably, said at least one organic salt has a melting point below 300° C., preferably below 200° C., preferably below 100° C., and then advantageously constitutes an ionic liquid, preferably below 30° C.

The main properties of ionic liquids are in particular those of being non-volatile (no diffusion of volatile organic compounds into the atmosphere), non-flammable (and therefore easy to handle and to store), stable at high temperature (up to 400° C. for some), very good conductors, and very stable with respect to water and oxygen.

By way of examples of organic cations, mention may in particular be made of the following cations: ammonium, sulfonium, pyridinium, pyrrolidinum, imidazolium, imidazolinium, phosphonium, lithium, guanidinium, piperidinium, thiazolium, triazolium, oxazolium, pyrazolium, and mixtures thereof.

By way of example of anions, mention may in particular be made of imides, in particular bis(trifluoromethanesulfonyl)imide (abbreviation $NTf2^-$); borates, in particular tetrafluoroborate (abbreviation BFC); phosphates, in particular hexafluorophosphate (abbreviation $PF_6^-$); phosphinates and phosphonates, in particular alkyl phosphonates; amides, in particular dicyanamide (abbreviation $DCA^-$); aluminates, in particular tetrachloroaluminate ($AlCl_4^-$), halides (such as bromide, chloride, iodide anions, etc.), cyanates, acetates ($CH_3COO^-$), in particular trifluoroacetate; sulfonates, in particular methanesulfonate ($CH_3SO_3^-$), trifluoromethanesulfonate; sulfates, in particular hydrogen sulfate, etc.

For the purpose of the invention, the term "organic salt" is intended to mean more particularly any organic salt which is stable at the temperatures used during the synthesis of the block copolymer according to the process of the invention. Those skilled in the art may refer to the technical sheets of the organic salts, which indicate the limiting temperature of decomposition of each organic salt.

By way of example of organic salts that can be used in the synthesis process according to the invention, mention may in particular be made of the organic salts based on an ammonium cation, based on an imidazolium cation or on an imidazolinium cation, based on a pyridinium cation, based on a dihydropyridinium cation, based on a tetrahydropyridinium cation, based on a pyrrolidinium cation, based on a guanidine cation or based on a phosphonium cation.

The organic salts based on an ammonium cation combine, for example:
an N-trimethyl-N-propylammonium cation with a bis (trifluoromethanesulfonyl)imide anion;
an N-trimethyl-N-butylammonium or N-trimethyl-N-hexylammonium cation with an anion chosen from bromide, tetrafluoroborate, hexafluorophosphate and bis(trifluoromethanesulfonyl)imide;
an N-tributyl-N-methylammonium cation with an iodide, bis(trifluoromethanesulfonyl)imide or dicyanamide anion;
a tetraethylammonium cation with a tetrafluoroborate anion;
a (2-hydroxyethyl)trimethylammonium cation with a dimethyl phosphate anion;
a di(2-hydroxyethyl)ammonium cation with a trifluoroacetate anion;
an N,N-di(2-methoxy)ethylammonium cation with a sulfamate anion;
an N,N-dimethyl(2-hydroxyethyl)ammonium cation with a 2-hydroxyacetate or trifluoroacetate anion;
an N-ethyl-N,N-dimethyl-2-methoxyethylammonium cation with a bis(trifluoromethylsulfonyl)imide anion;
an ethyldimethylpropylammonium cation and a bis(trifluoromethylsulfonyl)imide anion;
a methyltrioctylammonium cation and a bis(trifluoromethylsulfonyl)imide anion;
a methyltrioctylammonium cation and a trifluoroacetate or trifluoromethylsulfonate anion;
a tetrabutylammonium cation and a bis(trifluoromethylsulfonyl)imide anion;
a tetramethylammonium cation and a bis(oxalato(2-)) borate or tris(pentafluoroethyl)trifluoro-phosphate anion.

Mention may also be made of the organic salts based on imidazole, such as disubstituted imidazoles, monosubstituted imidazoles or trisubstituted imidazoles; in particular those based on an imidazolium cation or on an imidazolinium cation.

Mention may be made of the organic salts based on an imidazolium cation combining, for example:
an H-methylimidazolium cation with a chloride anion;
a 1-ethyl-3-methylimidazolium cation with a chloride, bromide, tetrafluoroborate, hexafluorophosphate, trifluoromethanesulfonate, bis(trifluoromethanesulfonyl) imide, tetrachloroaluminate, ethyl phosphonate or methyl phosphonate, methanesulfonate, ethyl sulfate or ethyl sulfonate anion;
a 1-butyl-3-methylimidazolium cation with a chloride, bromide, tetrafluoroborate, hexafluorophosphate, trifluoromethanesulfonate, bis(trifluoromethanesulfonyl) imide, tetrachloroaluminate, acetate, hydrogen sulfate, trifluoroacetate or methanesulfonate anion;
a 1,3-dimethylimidazolium cation with a methyl phosphonate anion;
a 1-propyl-2,3-dimethylimidazolium cation with a bis (trifluoromethanesulfonyl)imide anion;
a 1-butyl-2,3-dimethylimidazolium cation with a tetrafluoroborate or bis(trifluoromethane-sulfonyl)imide anion;
a 1-hexyl-3-methylimidazolium cation with a tetrafluoroborate, hexafluorophosphate or bis(trifluoromethanesulfonyl)imide anion;
a 1-octyl-3-methylimidazolium cation with a bis(trifluoromethanesulfonyl)imide anion;
a 1-ethanol-3-methylimidazolium cation with a chloride, bromide, tetrafluoroborate, hexafluorophosphate, bis (trifluoromethanesulfon-yl)imide or dicyanamide anion.

Mention may also be made, by way of examples, of the organic salts based on a pyridinium cation, such as: N-butyl-3-methylpyridinium bromide, N-butylmethyl-4-pyridinium chloride, N-butylmethyl-4-pyridinium tetrafluoroborate, N-butyl-3-methylpyridinium chloride, N-butyl-3-methylpyridinium dicyanamide, N-butyl-3-methylpyridinium methyl sulfate, 1-butyl-3-methylpyridinium tetrafluoroborate, N-butylpyridinium chloride, N-butylpyridinium tetrafluoroborate, N-butylpyridinium trifluoromethylsulfonate, 1-ethyl-3-hydroxymethylpyridinium ethylsulfate, N-hexylpyridiniumbis(trifluoromethylsulfonyl)imide, N-hexylpyridinium trifluoromethanesulfonate, N-(3-hydroxy-propyl)pyridiniumbis(trifluoromethylsulfonyl)imide, N-butyl-3-methylpyridinium trifluoromethanesulfonate or N-butyl-3-methylpyridinium hexafluorophosphate.

Mention may also be made, by way of examples, of the organic salts based on a pyrrolidinium cation, such as: 1-butyl-1-methylpyrrolidinium chloride, 1-butylmethylpyrrolidinium dicyanamide, 1-butyl-1-methylpyrrolidinium trifluoromethanesulfonate, 1-butyl-1-methylpyrrolidinium tris(pentafluoroethyl), 1-butyl-1-methylpyrrolidinium bis[oxalato(2-)]borate, 1-butyl-1-methylpyrrolidiniumbis(trifluoromethylsulfonyl)imide, 1-butyl-1-methylpyrrolidinium dicyanamide, 1-butyl-1-methylpyrrolidinium trifluoroacetate, 1-butyl-1-methylpyrrolidinium trifluoromethanesulfonate, 1-butyl-1-methylpyrrolidiniumtris(pentafluoroethyl)tri-fluorophosate, 1,1-dimethylpyrrolidinium iodide, 1-(2-ethoxyethyl)-1-methylpyrrolidiniumbis(trifluoro-methylsulfonyl)imide, 1-hexyl-1-methylpyrrolidiniumbis(trifluoromethylsulfonyl)imide, 1-(2-methoxyethyl)-1-methylpyrrolidiniumbis(trifluoro-methylsulfonyl)imide, 1-methyl-1-octylpyrrolidinium chloride or 1-butyl-1-methylpyrrolidinium bromide.

Mention may also be made of the organic salts combining:
a 1-ethyl-1-methylpyrrolidinium cation with a bromide, tetrafluoroborate, hexafluorophosphate or trifluoromethanesulfonate anion;
a 1-butyl-1-methylpyrrolidinium cation with a chloride, bromide, tetrafluoroborate, hexafluorophosphate, trifluoromethanesulfonate, bis(trifluoromethanesulfonyl)imide, dicyanamide, acetate or hydrogen sulfate anion;
an N-propyl-N-methylpyrrolidinium cation with a bis(trifluoromethanesulfonyl)imide anion;
a 1-methyl-1-propylpiperidinium cation with a bis(trifluoromethanesulfonyl)imide anion.

Mention may also be made, by way of examples, of the organic salts based on a guanidine cation, such as: guanidine trifluoromethylsulfonate, guanidine tris(pentafluoroethyl)trifluorophosphate or hexamethylguanidine tris(pentafluoroethyl)trifluoro-phosphate.

Mention may be made of the organic salts based on a phosphonium cation, such as trihexyl(tetradecyl)phosphonium bis[oxalato(2-)]borate; trihexyl(tetradecyl)phosphonium bis[trifluoro-methylsulfonyl)imide; or trihexyl(tetradecyl)phos-phonium tris(pentafluoroethyl)trifluorophosphate.

The list of organic salts and of cations and anions mentioned above that can be part of the composition of the organic salts that can be used according to the invention is given only by way of examples and is neither exhaustive nor limiting. Consequently, the addition of any organic salt can of course be envisioned in the process of the invention, provided that the decomposition temperature of the organic salt is above the temperatures of the steps of the process of the invention during which the organic salt is present.

A polyamide-based thermoplastic elastomer (TPE-A) for the purpose of the invention, such as a PEBA, is a block copolymer comprising a sequence of alternating hard blocks (HB) and soft blocks (SB), according to the following general formula:

-[HB-SB]n- and in which:

HB or Hard Block represents a block comprising polyamide (homopolyamide or copolyamide) or a mixture of blocks comprising polyamide (homopolyamide or copolyamide), hereinafter independently abbreviated to PA or HB block;

SB or Soft Block represents a block based on polyether (PE block), on polyester (PES block), on polydimethylsiloxane (PDMS block), on polyolefin (PO block), on polycarbonate (PC block) and/or on any other polymer having a low glass transition temperature, or on mixtures thereof in the form of alternating, random, or block copolymers. Preferably, SB is a block based on polyether totally or partially comprising ethylene oxide units;

n represents the number of repeating units of the -HB-SB-unit of said copolymer.

n is included in the range of from 1 to 60, preferably from 5 to 30, or better still from 6 to 20.

For the purpose of the invention, the term "low glass transition temperature" for a polymer which is part of the composition of an SB is intended to mean a glass transition temperature Tg below 15° C., preferably below 0° C., preferably below −15° C., more preferably below −30° C. By way of example, said soft block may be based on PEG having a number-average molar mass equal to 1500 g/mol and a Tg of about −35° C. Said glass transition temperature Tg may also be below −50° C., in particular when said soft block is based on PTMG.

The process for synthesizing an alloy based on a block copolymer according to the invention uses any means for attaching said hard blocks to said soft blocks. Several means can be envisioned: in solution, in bulk or via an interfacial technique, or even by combining several of these methods, as described in chapter 9 of the Handbook of Condensation Thermoplastic Elastomers (edited by Stoyko Fakirox, Wiley-VCH, Weinheim, 2005).

The TPE-As, such as PEBAs, generally result from the bulk polycondensation of hard blocks (HB) comprising reactive end groups with soft blocks (SB) comprising complementary reactive end groups, such as:
HB comprising amine chain ends with SB comprising carboxylic acid or isocyanate chain ends,
HB comprising carboxylic acid chain ends with SB comprising amine, alcohol or isocyanate chain ends.

The PEBAs, for example, result from the polycondensation of polyamide HB blocks comprising carboxylic acid chain ends with polyether SB blocks comprising alcohol or amine chain ends.

In practice, the process for attaching the HB to the SB is carried out either in two main steps, or in a single main step.

Whether in one or two steps, it is advantageous to carry out the process in the presence of a catalyst. The term "catalyst" is intended to mean any product which makes it possible to facilitate the linking of the polyamide blocks and of the soft blocks, in particular by esterification or by amidition. The esterification catalyst is advantageously a derivative of a metal chosen from the group made up of titanium, zirconium and hafnium, or else a strong acid such as phosphoric acid or boric acid. Use may be made of the catalysts described in U.S. Pat. Nos. 4,331,786, 4,115,475, 4,195,015, 4,839,441, 4,864,014, 4,230,838 and 4,332,920, WO 04 037898, EP 1262527, EP 1270211, EP 1136512, EP 1046675, EP 1057870, EP 1155065, EP 506495 and EP 504058.

According to a first embodiment, the process of the invention comprises two main steps. In a first step (I), at least one PA block is prepared, and in a second step (II), said at least one PA block is reacted with at least one SB block, preferably in the presence of a catalyst and under reduced pressure.

Said step (I) may comprise any means known to those skilled in the art for producing polyamide blocks, for example by a polycondensation reaction between polyamide precursors and a dicarboxylic acid or a diamine as chain regulator. In this case, step I is divided up into several substeps:

- (I-1) charging a mixture comprising at least one PA precursor and at least one chain regular, such as a diamine or a diacid, to a reactor (for example an autoclave).

Said chain regulator is preferably chosen from adipic acid, sebacic acid, terephthalic acid, isophthalic acid, and mixtures thereof;

- (I-2) a phase of heating said mixture to a temperature included in the range of from 180 to 350° C., preferably from 200 to 300° C., preferably from 230 to 290° C.

Water can optionally be added to the mixture in order to improve thermal conduction and/or in order to achieve a sufficient pressure, in particular for opening the rings, of lactam 12 for example;

- (I-3) a hot isothermal phase, during which the temperature of the mixture is kept constant, included in the range of from 180 to 350° C., preferably from 200 to 300° C., preferably from 230 to 290° C., for a period of time sufficient to bring all the materials introduced in I-1 to a fluid state, i.e. having a viscosity that is sufficiently low to have a homogeneous mixture.

The hot isothermal phase time is generally included in the range of from 15 minutes to 5 hours, preferably from 30 minutes to 4 hours, preferably from 30 minutes to 3 hours.

During this hot isothermal phase, the pressure in the reactor reaches, for example, between 1 and 40 bar. Preferably, the pressure does not exceed 30 bar, but this maximum pressure in fact depends on the reactor and on the way in which it was constructed;

- (I-4) a phase of eliminating water, by expansion (decrease in pressure) of said mixture during which the mixture returns to atmospheric pressure and/or by distillation. The water is water optionally added during phase I-1, I-2 and/or I-3 or water formed during these phases; then
- (I-5) sweeping under inert gas until there is complete polymerization of the mixture in the form of polyamide blocks.

The sweeping time may be included in the range of from a few minutes to a few hours, preferably from 5 minutes to 5 hours, preferably from 30 minutes to 3 hours, preferably from 1 hour to 2 hours.

Step I may also comprise one or more of the following substeps:

- (I-6) an optional step of maintaining under reduced pressure, for example below 500 mbar, preferably below 100 mbar, in order to increase the polymerization yield if necessary;
- (I-7) an optional step of recovering the hard blocks HB, i.e. the PA blocks.

All the starting materials necessary for making up the HB block may be charged to the reactor at the start in the order that those skilled in the art judge to be appropriate, as is the case, for example, during step I-1 of the process described above by way of example, but it is of course possible to envision the introduction of one or more starting material(s) during any substep I-1 to I-7.

The temperature for this main step I is included in the range of from 180 to 350° C., preferably from 200 to 300° C., or better still from 230 to 290° C.

Said at least one hard block HB (PA block) can be extruded for subsequent use, stored in the reactor or transferred into another reactor, in order to carry out step II described hereinafter.

Step (II) comprises the following substep(s):

- (II-1) bringing at least a part of the amount of at least one soft block SB into contact, in a reactor, with the PA blocks formed in step I, and adjusting the temperature of the mixture obtained if necessary, such that its temperature is included in the range of from 180 to 350° C., preferably from 200 to 300° C., preferably from 200 to 260° C.;
- (II-2) an optional step of sweeping with nitrogen (or with another inert gas) and/or placing under slightly reduced pressure, for example less than 500 mbar, preferably less than 100 mbar, so as to eliminate the water which forms in the reactor during the copolymerization;
- (II-3) an optional step of introducing the remaining part of said at least one SB block where appropriate.

The temperature and the duration of each step can be readily adjusted by those skilled in the art in order to optimize the polycondensation reactivity while at the same time minimizing the side reactions. The temperature for this main step II is also included in the range of from 180 to 350° C., preferably from 200 to 300° C., or better still from 200 to 260° C.

According to a second embodiment, the process according to the invention comprises a single main step, characterized in that said at least one soft block is introduced directly during the main step I, in the same way as the starting materials necessary for forming the PA block, i.e. during any intermediate step I-1 to I-7. In this embodiment, the main steps I and II are in fact carried out simultaneously, hence a saving in terms of time, whereas, in the embodiment in two main steps, steps I and II are carried out successively.

Irrespective of its embodiment (in one step or in two steps), the process of the invention comprises a final step III of finalizing and recovering a block copolymer alloy. This step III comprises at least two substeps:

- (III-1) adjustment of the viscosity of the copolymer alloy obtained: the reactor is placed under reduced pressure, under a strong vacuum, until the desired viscosity, i.e. the desired molar mass, for the copolymer is reached. The term "desired molar mass" is intended to mean a number-average molar mass in the range of from 10 000 to 100 000 g/mol, preferably of from 15 000 to 50 000 g/mol, preferably of from 20 000 to 40 000 g/mol. The pressure during this substep is preferably less than 100 mbar, preferably less than 50 mbar, preferably less than 10 mbar, more preferentially less than 1 mbar.

The increase in molar mass of the copolymer, and therefore in the viscosity of the medium, is for example determined by measuring the change in the value of the twisting torque exerted by the molten polymer on the stirrer or else by measuring the electrical power consumed by the stirrer, for a given stirring speed;

- (III-2) extrusion and recovery of said block copolymer alloy, for example in the form of granules or in any other form;
- (III-3) an additional step of stoving the granules so as to reduce the residual water content thereof below 0.1% by weight.

The stirring speed of each step is optimized according to the rheology of the medium and the nature of the stirrer.

The placing under reduced pressure can be carried out gradually or in successive stages. The level of pressure under maximum vacuum depends on the nature of the entities present, on their hydrophilic or hydrophobic nature and on their reactivity. A catalyst may be added during one of steps I and/or II, preferably during one of the substeps II, for a hydrolysis-sensitive catalyst.

According to the synthesis process of the invention, regardless of the number of main steps and the method of attachment of the HB to the SB, at least one organic salt is added during any step(s) of said process: step I, II and/or III. The amount of said at least one organic salt added represents from 0.1% to 30% by weight relative to the total weight of alloy. The choice of the step for the addition depends on the sensitivity of the organic salt to hydrolysis and to temperature. Specifically, an organic salt sensitive to hydrolysis or to temperature will preferably be added during a step of sweeping under nitrogen in order to minimize its residence time at high temperature and/or in order to minimize the time spent by the organic salt in the presence of a large amount of water.

Preferably, the organic salt is added starting from the main step II. This is because, surprisingly, it has been demonstrated that, according to the process of the present invention, the addition of organic salt during step II accelerates the reaction kinetics for polymerization between the PA blocks and the soft blocks. Consequently, the expected viscosity for the final copolymer alloy is reached much more rapidly during step III-1. Examples 1 to 4 and 10 to 14 of the description show this advantageous effect of the addition of organic salt during step II.

The organic salt may also be added during step III, both during step III-1 of adjusting the viscosity of the copolymer alloy, and during step III-2 of extrusion and/or during step III-3 of stoving.

For example, organic salt may in particular be added at the outlet of extrusion of the copolymer (III-2) by means of an impregnation liquid containing the organic salt. Said impregnation liquid may contain 100% of organic salt(s) or else may comprise at least one organic salt diluted by 1 to 99% in a solvent. This diluted or pure organic salt-based impregnation liquid makes it possible to directly impregnate the extruded copolymer (for example rods or granules of this copolymer). According to one embodiment, the extruded copolymer and the organic salt are brought into contact in a container and the whole is stirred for a few hours. The impregnation of the copolymer may take from 5 minutes to 10 hours, depending on the level of organic salt incorporated into the copolymer and the ability of the impregnation liquid to diffuse in the copolymer. The resulting copolymer alloy may comprise from 0.1% to 30% by weight of pure organic salt relative to the total weight of the alloy.

Advantageously, said impregnation is carried out during the stoving step (III-3). For example, the granules are brought into contact with the organic salt directly in a dryer, and stirred for 8 hours at 60° C. under vacuum.

The impregnation of the TPE-A granules can be carried out at the beginning or during the drying, but it requires at least a few hours of contact. The impregnation liquid is added by pouring it directly onto the granules or via a dropwise system, or else via a pulverizing system such as a spray. The addition of organic salt by impregnation can be carried out at a temperature ranging from ambient temperature to the drying temperature or stoving temperature of step III-3 (for example at 60° C.)

Adjuvants and/or additives may also be added to the alloy, according to the synthesis process of the invention, in particular before step (II-1), and/or during any other step of the process (I, II and/or III). In the same way as for the addition of organic salt, the most suitable step for adding these adjuvants and/or additives is selected according to the sensitivity of the additive and/or of the adjuvant to degradation or to any other reaction that may modify its structure and its effectiveness.

By way of examples of additives, mention may be made of organic or inorganic fillers, reinforcing agents, plasticizers, stabilizers, antioxidants, anti-UV agents, flame retardants, carbon black, etc.

By way of examples of adjuvants, mention may be made of mineral or organic dyes, pigments, dyes, demolding agents, lubricants, foaming agents, anti-impact agents, shrink-proofing agents, fire retardants and nucleating agents.

Antistatic agents other than the organic salts may also be added during the process of the invention, such as inorganic salts, hygroscopic agents; fatty acids; lubricants; metals; metal film coatings; metal powders; metal nanopowders; aluminosilicates; amines, such as quaternary amines; esters; fibers; carbon black; carbon fibers; carbon nanotubes; polyethylene glycol; intrinsically conductive polymers, such as derivatives of polyaniline, of polythiophene or of polypyrrole; masterbatches; and mixtures thereof; and/or any other agent which makes it possible to increase the charge flow by increasing the surface conductivity of the polymer alloy.

A subject of the present invention is also a TPE-A thermoplastic elastomer alloy, i.e. an alloy of a block copolymer comprising at least one rigid polyamide (homopolyamide or copolyamide) block and at least one flexible block, obtained by means of the synthesis process described above and having improved antistatic properties, by virtue of the incorporation of at least one organic salt during said synthesis process. Such a TPE-A alloy comprises, for example, a copolymer comprising polyether blocks and polyamide blocks (PEBA).

The block copolymer alloy having improved antistatic properties of the invention incorporates from 0.1% to 30% by weight of at least one organic salt, relative to the total weight of copolymer. It preferably incorporates from 0.1% to 20%, preferably from 0.1% to 5% by weight of at least one organic salt, relative to the total weight of copolymer.

In the copolymer alloy according to the invention:
  the proportion by weight of said at least one rigid polyamide block represents from 5% to 95%, preferably from 15% to 95%,
  the proportion by weight of said at least one flexible block represents from 5% to 95%, preferably from 5% to 85%,
relative to the total weight of copolymer.

The term "rigid or hard blocks" in the TPE-A alloys according to the invention is intended to mean polyamide blocks that can comprise homopolyamides or copolyamides.

Preferably, the number-average molar mass Mn of the polyamide blocks is included in the range of from 400 to 20 000 g/mol, preferably from 500 to 10 000 g/mol, and more preferably from 600 to 3000 g/mol.

In the block copolymer alloys according to the invention, the PA blocks may comprise carboxylic acid end groups, and the term diacid PA is then used, or else they may comprise an amine end group, and the term diamine PA is used.

The bonds between the PA blocks and the soft blocks (SB) can therefore be ester bonds or else amide bonds.

The polyamide blocks comprising dicarboxylic chain ends originate, for example, from the condensation of polyamide precursors in the presence of a chain-limiting dicarboxylic acid.

The polyamide blocks comprising diamine chain ends originate, for example, from the condensation of polyamide precursors in the presence of a chain-limiting diamine.

Three types of polyamides may be part of the composition of these PA blocks.

According to a first type, the polyamide blocks originate from the condensation of at least one (aliphatic, cycloaliphatic or aromatic) dicarboxylic acid, in particular those having from 4 to 36 carbon atoms, preferably those having from 6 to 18 carbon atoms, and of at least one (aliphatic, cycloaliphatic or aromatic) diamine chosen in particular from those having from 2 to 36 carbon atoms, preferably those having from 6 to 12 carbon atoms.

By way of examples of aliphatic diacids, mention may be made of butanedioc acid, adipic acid, suberic acid, azelaic acid, sebacic acid, dodecanedicarboxylic acid, myristic acid, tetradecanedicarboxylic acid, hexadecanedicarboxylic acid, octadecanedicarboxylic acid and dimerized fatty acids.

By way of examples of cycloaliphatic diacids, mention may be made of 1,4-cyclohexyldicarboxylic acid.

By way of examples of aromatic diacids, mention may be made of terephthalic (T), isophthalic acid (I) and the sodium, potassium or lithium salt of 5-sulfoisophthalic acid.

By way of examples of aliphatic diamines, mention may be made of tetramethylenediamine, hexamethylenediamine, 1,10-decamethylenediamine, dodecamethylenediamine and trimethylhexamethylenediamine.

By way of examples of cycloaliphatic diamines, mention may be made of the isomers of bis(4-aminocyclohexyl) methane (BACM or PACM), bis(3-methyl-4-aminocyclohexyl)methane (BMACM or MACM), and 2,2-bis(3-methyl-4-aminocyclohexyl)propane (BMACP), isophoronediamine (IPDA), 2,6-bis(amino-methyl)norbornane (BAMN) and piperazine (Pip).

Advantageously, the copolymer according to the invention comprises at least one PA block based on PA 4.4, PA 4.6, PA 4.9, PA 4.10, PA 4.12, PA 4.13, PA 4.14, PA 4.16, PA 4.18, PA 4.36, PA 6.4, PA 6.6, PA 6.9, PA 6.10, PA 6.12, PA 6.13, PA 6.14, PA 6.16, PA 6.18, PA 6.36, PA 9.4, PA 9.6, PA 9.10, PA 9.12, PA 9.13, PA 9.14, PA 9.16, PA 9.18, PA 9.36, PA 10.4, PA 10.6, PA 10.9, PA 10.10, PA 10.12, PA 10.13, PA 10.14, PA 10.16, PA 10.18, PA 10.36, PA 10.T, PA 10.1, PA BMACM.4, PA BMACM.6, PA BMACM.9, PA BMACM.10, PA BMACM.12, PA BMACM.13, PA BMACM.14, PA BMACM.16, PA BMACM.18, PA BMACM.36, PA PACM.4, PA PACM.6, PA PACM.9, PA PACM.10, PA PACM.12, PA PACM.13, PA PACM.14, PA PACM.16, PA PACM.18, PA PACM.36, PA Pip.4, PA Pip.6, PA Pip.9, PA Pip.10, PA Pip.12, PA Pip.13, PA Pip.14, PA Pip.16, PA Pip.18 and/or PA Pip.36, and copolymers thereof.

According to a second type, the polyamide blocks result from the condensation of one or more alpha, omega-aminocarboxylic acids and/or of one or more lactams having from 6 to 12 carbon atoms in the presence of a dicarboxylic acid having from 4 to 36 carbon atoms or of a diamine.

By way of examples of lactams, mention may be made of caprolactam, enantholactam and lauryllactam.

By way of examples of alpha, omega-aminocarboxylic acids, mention may be made of aminocaproic acid, 7-aminoheptanoic acid, 11-aminoundecanoic acid and 12-aminododecanoic acid.

Advantageously, the polyamide blocks of the second type are of polyamide 11, of polyamide 12 or of polyamide 6.

According to a third type, the polyamide blocks result from the condensation of at least one monomer of the first type with at least one monomer of the second type. In other words, the polyamide blocks result from the condensation of at least one alpha, omega-aminocarboxylic acid (or one lactam) with at least one diamine and one dicarboxylic acid.

In this case, the PA blocks are prepared by polycondensation:
  of the aliphatic, cycloaliphatic or aromatic diamine(s) having X carbon atoms;
  of the dicarboxylic acid(s) having Y carbon atoms; and
  of the comonomer(s) {Z}, chosen from lactams and alpha, omega-aminocarboxylic acids having Z carbon atoms;
  in the presence of a chain limiter chosen from dicarboxylic acids or diamines or of an excess of diacid or of diamine used as structural unit.

Advantageously, the dicarboxylic acid having Y carbon atoms is used as chain limiter, said dicarboxylic acid being introduced in excess relative to the stoichiometry of the diamine(s).

According to another copolyamide variant, the polyamide blocks result from the condensation of at least two different alpha, omega-aminocarboxylic acids or of at least two different lactams having from 6 to 12 carbon atoms or of a lactam and of an aminocarboxylic acid not having the same number of carbon atoms, optionally in the presence of a chain limiter.

By way of examples of polyamide blocks, mention may be made of those formed by the following polyamides (copolyamides):
  PA 6/12 in which 6 denotes caprolactam and 12 denotes lauryllactam;
  PA 11/12 in which 11 denotes 11-aminoundecanoic acid and 12 denotes lauryllactam;
  PA 6/11 in which 6 denotes caprolactam and 11 denotes 11-aminoundecanoic acid;
  PA 6/6.6 in which 6 denotes caprolactam and 6.6 denotes a monomer resulting from the condensation of hexamethylenediamine with adipic acid.

By way of examples, mention may be made of PA 10.10/11, PA 6.10/11, PA 10.12/11, PA 10.10/11/12, PA 6.10/10.10/11, PA 6.10/6.12/11, PA 6.10/6.12/10.10, PA 11/6.36, PA 11/10.36 and PA 10.10/10.36.

The thermoplastic elastomer (TPE-A) according to the invention also comprises at least one flexible block, i.e. a block having a low glass transition temperature (Tg). The term "low glass transition temperature" is intended to mean a glass transition temperature Tg below 15° C., preferably below 0° C., advantageously below −15° C., even more advantageously below −30° C., optionally below −50° C.

Preferably, the number-average molar mass Mn of the flexible blocks according to the invention is included in the range of from 250 to 5000 g/mol, preferably from 250 to 3000 g/mol, and more preferably from 500 to 2000 g/mol.

The term "flexible or soft blocks" that can be envisioned in the TPE-As according to the invention is intended to mean in particular those chosen from polyether blocks, polyester blocks, polysiloxane blocks, such as polydimethylsiloxane or PDMS blocks, polyolefin blocks and polycarbonate blocks, and mixtures thereof.

For the purpose of the invention, the term "polyether (hereinafter abbreviated to PE) blocks" is intended to mean polyoxyalkylenes, such as polyalkylene ether polyols, in particular polyalkylene ether diols. The PE blocks of the copolymer of the invention comprise at least one molecule chosen from poly(ethylene glycol) (PEG), poly(1,2-propylene glycol) (PPG), poly(tetramethylene glycol) (PTMG), poly(hexamethylene glycol), poly(1,3-propylene glycol) (PO$_3$G), poly(3-alkyl tetrahydrofuran), in particular poly(3-methyltetrahydrofuran) (poly(3MeTHF)), and mixtures thereof. It is also possible to envision a PE block of alternating, random or block "copolyether" type, containing a sequence of at least two types of PE mentioned above.

The polyether blocks may also comprise blocks obtained by oxyethylation of bisphenols, for instance bisphenol-A. The latter products are described in patent EP 613 919.

The polyether blocks may also comprise ethoxylated primary amines. By way of example of ethoxylated primary amines, mention may be made of the products of formula:

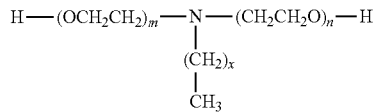

in which m and n are between 1 and 20 and x between 8 and 18. These products are commercially available under the trade mark Noramox® from the company CECA and under the trade mark Genamin® from the company Clariant.

Thus, the chain ends of the PE blocks may be diOH, diNH$_2$, diisocyanate or diacid depending on their synthesis process.

The PE blocks containing NH$_2$ chain ends can be obtained by cyanoacetylation of alpha, omega-dihydroxylated aliphatic polyoxyalkylene blocks called polyetherdiols, such as the Jeffamines® D300, D400, D2000, ED-600, ED-900 and ED2003, or the Elastamines® RP-409, RP-2009, RT-1000, R$^E$-600, R$^E$-900, RE-2000, HT-1700 and HE-180 from the company Huntsman. Such blocks are described in patents JP 2004346274, JP 2004352794 and EP 1482011.

Advantageously, the SB block in the block copolymer of the alloy according to the invention is a block containing ethylene glycol units. Preferably, the SB block is a PEG block or a block obtained by ethoxylation of a bisphenol (for example bisphenol A).

It is also possible to envision a polyether block which is a copolymer of which the major monomer is ethylene oxide. In this case, the ethylene oxide represents more than 50% by weight relative to the total weight of copolymer.

The total PEG content in the block copolymer alloy according to the invention is preferably greater than 35% by weight, preferably greater than or equal to 50% by weight. It may of course comprise other polyether blocks or other flexible blocks (for example polyester).

Surprisingly, an improved antistatic effect is also obtained by adding organic salt during the synthesis of an alloy of a copolymer comprising blocks predominantly made up of PTMG, said blocks having a low water uptake.

Contrary to the widespread prejudice in antistatic uses, the presence of (hydrophilic) PEG blocks, while it is preferred, is not therefore obligatory in the synthesis process according to the invention in order to reveal an improved antistatic effect on the copolymer alloy according to the invention.

Advantageously, the block copolymer alloy of the present invention comprises a polyether block amide, abbreviated to PEBA.

PEBAs result from the polycondensation of polyamide blocks comprising reactive end groups with polyether blocks comprising reactive end groups, such as, inter alia:

1) polyamide blocks comprising diamine chain ends with polyoxyalkylene blocks comprising dicarboxylic chain ends;
2) polyamide blocks comprising dicarboxylic chain ends with polyoxyalkylene blocks comprising diamine chain ends, obtained by cyanoethylation and hydrogenation of alpha, omega-dihydroxylated aliphatic polyoxyalkylene blocks called polyetherdiols;
3) polyamide blocks comprising dicarboxylic chain ends with polyetherdiols, the products obtained being, in this particular case, polyetheresteramides.

Advantageously, the PEBA according to the invention comprises PA12-PEG, PA6-PEG, PA6/12-PEG, PA11-PEG, PA12-PTMG, PA6-PTMG, PA6/12-PTMG, PA11-PTMG, PA12-PEG/PPG, PA6-PEG/PPG, PA6/12-PEG/PPG, and/or PA11-PEG/PPG.

For the purpose of the invention, the term "polyester (hereinafter abbreviated to PES) blocks" is intended to mean the polyesters customarily produced by polycondensation between a dicarboxylic acid and a diol. The suitable carboxylic acids include those mentioned above used to form the polyamide blocks, with the exception of the aromatic acids, such as terephthalic acid and isophthalic acid. The suitable diols include linear aliphatic diols, such as ethylene glycol, 1,3-propylene glycol, 1,4-butylene glycol or 1,6-hexylene glycol, branched diols, such as neopentyl glycol, 3-methylpentane glycol or 1,2-propylene glycol, and cyclic diols, such as 1,4-bis(hydroxylmethyl)cyclohexane and 1,4-cyclohexanedimethanol.

The term "polyesters" is also intended to mean poly (caprolactone) and PESs based on fatty acid dimers, in particular the products of the Priplast® range from the company Uniqema.

It is also possible to envision a PES block of alternating, random or block "copolyester" type, containing a sequence of at least two types of PES mentioned above.

For the purpose of the invention, the term "polysiloxane (hereinafter abbreviated to PSi) block" is intended to mean any organosilicon polymer or oligomer of linear or cyclic, branched or crosslinked structure, obtained by polymerization of functionalized silanes and consisting essentially of a repetition of main units in which silicon atoms are linked together via oxygen atoms (siloxane bond Si—O—Si), optionally substituted hydrocarbon-based radicals being directly bonded, by means of a carbon atom, onto said silicon atoms. The most common hydrocarbon-based radicals are alkyl, especially C1-C10 alkyl, radicals and in particular methyl, fluoroalkyl radicals, aryl radicals and in particular phenyl, and alkenyl radicals and in particular vinyl; other types of radicals capable of being bonded either directly, or by means of a hydrocarbon-based radical, to the siloxane chain are in particular hydrogen, halogens and in particular chlorine, bromine or fluorine, thiols, alkoxy radicals, polyoxyalkylene (or polyether) radicals and in particular polyoxyethylene and/or polyoxypropylene radicals, hydroxyl or hydroxyalkyl radicals, substituted or unsubstituted amine groups, amide groups, acyloxy or acyloxyalkyl radicals, hydroxyalkylamino or aminoalkyl radicals, quaternary ammonium groups, amphoteric or betaine groups, anionic groups such as carboxylates, thioglycolates, sulfosuccinates, thiosulfates, phosphates and sulfates, and mixtures thereof, this list of course being in no way limiting (silicones termed "organomodified").

Preferably, said polysiloxane blocks comprise polydimethylsiloxane (hereinafter abbreviated to PDMS blocks), polymethylphenylsiloxane and/or polyvinylsiloxane.

For the purpose of the invention, the term "polyolefin block (hereinafter abbreviated to PO block)" is intended to mean any polymer comprising as monomer an alpha-olefin, i.e. homopolymers of an olefin or copolymers of at least one alpha-olefin and of at least one other copolymerizable monomer, the alpha-olefin advantageously having from 2 to 30 carbon atoms.

By way of example of an alpha-olefin, mention may be made of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These alpha-olefins can be used alone or as a mixture of two or more than two.

By way of examples, mention may be made of:
ethylene homopolymers and copolymers, in particular low density polyethylene (LDPE), high density polyethylene (HDPE), linear low density polyethylene (LLDPE), very low density polyethylene (VLDPE), polyethylene obtained by metallocene catalysis;
propylene homopolymers and copolymers;
essentially amorphous or atactic poly-alpha-olefins (APAOs);
ethylene/alpha-olefin copolymers, such as ethylene/propylene copolymers, EPR (ethylene-propylene-rubber) elastomers, and EPDM (ethylene-propylene-diene), and mixtures of polyethylene with an EPR or an EPDM; styrene/ethylene-butene/styrene (SEBS), styrene/butadiene/styrene (SBS), styrene/isoprene/styrene (SIS), and styrene/ethylene-propylene/styrene (SEPS) copolymers;
copolymers of ethylene with at least one product chosen from unsaturated carboxylic acid salts or esters, for instance alkyl (meth)acrylates, it being possible for the alkyl to have up to 24 carbon atoms, saturated carboxylic acid vinyl esters, for instance vinyl acetate or vinyl propionate, and dienes, for instance 1,4-hexadiene or polybutadiene.

According to one advantageous embodiment of the invention, said at least one polyolefin block comprises polyisobutylene and/or polybutadiene.

According to one particularly advantageous embodiment, the block copolymer according to the invention comprises at least one flexible polyolefin block (PO block) and at least one hydrophilic hard block (hereinafter abbreviated to hHB) comprising both polyamide and polyether, such as a polyetheramide block, a polyetheresteramide block, and/or a polyetheramideimide block, etc. Said PO block preferably comprises a polyolefin comprising acid, alcohol or amine end groups. Preferably, the PO block is obtained by thermal degradation of high-molecular-weight polyolefins so as to form polyolefins which have a lower weight and which are functionalized (reference method: Japanese Kokai Publication Hei-03-62804). With regard to the hHB block, it may also comprise at least one polymer chosen from: cationic polymers, of quaternary amine type and/or phosphorus-containing derivatives; and/or anionic polymers, of modified diacid type, comprising a sulfonate group and capable of reacting with a polyol. The addition of an organic salt can then be envisioned in the preparation of the hHB block or during the reaction between the PO block and the hHB block. Document U.S. Pat. No. 6,552,131 describes the synthesis and the various possible structures for the copolymer comprising PO blocks and hHB blocks, it being possible, of course, to envision said structures in the process according to the invention.

For the purpose of the invention, the term "polycarbonate block" (hereinafter abbreviated to PC block) is intended to mean more particularly any aliphatic polycarbonate. The aliphatic polycarbonates are described, for example, in documents DE2546534 and JP1009225. Such homopolymeric or copolymeric polycarbonates are also described in document US471203. Applications WO92/22600 and WO95/12629 describe copolymers comprising polycarbonate blocks and also the processes for the synthesis thereof. The blocks (and the synthesis thereof) described in these documents can be perfectly envisioned for the synthesis of a copolymer alloy comprising PC blocks according to the invention. Preferably, the polycarbonate blocks of the copolymer alloys according to the invention have the formula:

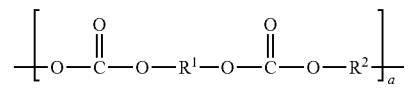

in which a is an integer from 2 to 300; and $R^1$ and $R^2$, which may be identical or different, represent a straight or branched, aliphatic or alicyclic chain having from 2 to 18 carbon atoms, or else represent a polyoxyalkylene group or else represent a polyester group.

The polycarbonates in which $R^1$ and $R^2$ are chosen from hexylene, decylene, dodecylene, 1,4-cyclohexylene, 2,2-dimethyl-1,3-propylene, 2,5-dimethyl-2,5-hexylene or polyoxyethylene, are preferred.

While the block copolymers described above generally comprise at least one rigid polyamide block and at least one flexible block, it is obvious that the present invention in fact covers all the copolymer alloys comprising two, three, four (or more) different blocks chosen from those described in the present description, as long as at least one of these blocks is a polyamide block.

Advantageously, the copolymer alloy according to the invention comprises a segmented block copolymer comprising three different types of blocks (called "triblock" in the present description of the invention), which result from the condensation of several of the blocks described above. Said triblock is preferably chosen from copolyetheresteramides and copolyetheramideurethanes, in which:
the percentage by weight of rigid polyamide block is greater than 10%;
the percentage by weight of flexible blocks is greater than 20%;
relative to the total mass of triblock.

The block copolymer alloy of the invention may be used both alone and as a mixture, said alloy representing, by weight, from 5% to 100%, preferably from 5% to 70%, preferably from 5% to 30%, relative to the total mass of the mixture.

The copolymer alloy according to the invention may have added thereto stabilizers, plasticizers, lubricants, natural or organic fillers, dyes, pigments, pearlescent agents, antimicrobial agents, flame retardants, antistatic agents, agents for modifying the viscosity of the copolymer, and/or any other additive or adjuvant already mentioned and well known to those skilled in the art in the field of thermoplastic polymers.

Advantageously, the rigid blocks, like the soft blocks, may result from renewable materials and/or from materials of fossil origin. Advantageously, said rigid blocks and/or the soft blocks result at least partially from renewable materials. According to one particularly advantageous mode of the present invention, the polyamide blocks and/or the polyether blocks and/or the polyester blocks and/or the polysiloxane blocks and/or the polyolefin blocks and/or the polycarbonate blocks result totally from renewable materials.

A material of renewable origin, also called biomaterial, is an organic material in which the carbon originates from $CO_2$ that has been recently fixed (on the human scale), by photosynthesis, from the atmosphere. On land, this $CO_2$ is captured or fixed by plants. In the sea, the $CO_2$ is captured or fixed by bacteria or by plankton performing photosynthesis. A biomaterial (100% carbon of natural origin) has a $^{14}C/^{12}C$ isotope ratio of greater than $10^{-12}$, typically of about $1.2\times10^{-12}$, whereas a fossil material has a zero ratio. This is because the $^{14}C$ isotope forms in the atmosphere and is subsequently integrated by photosynthesis, according to a timescale of no more than a few decades. The half-life of $^{14}C$ is 5730 years. Materials derived from photosynthesis, namely plants in general, therefore necessarily have a maximum content of $^{14}C$ isotope.

The biomaterial content or biocarbon content is determined by applying the standards ASTM D 6866 (ASTM D 6866-06) and ASTM D 7026 (ASTM D 7026-04). The object of the standard ASTM D 6866 is "Determining the Biobased Content of Natural Range Materials Using Radiocarbon and Isotope Ratio Mass Spectrometry Analysis", whereas the object of standard ASTM D 7026 is "Sampling and Reporting of Results for Determination of Biobased Content of Materials via Carbon Isotope Analysis". The second standard refers back, in its first paragraph, to the first.

The first standard describes a test for measuring the $^{14}C/^{12}C$ ratio of a sample and compares it with the $^{14}C/^{12}C$ ratio of a reference sample of 100% renewable origin, so as to give a relative percentage of C of renewable origin in the sample. The standard is based on the same concepts as $^{14}C$ dating, but without the application of the dating equations.

The ratio thus calculated is denoted the "pMC" (percent Modern Carbon). If the material to be analyzed is a mixture of biomaterial and of fossil material (without radioactive isotope), then the value of pMC obtained is directly correlated to the amount of biomaterial present in the sample. The reference value used for $^{14}C$ dating is a value dating to the 1950s. This decade was chosen owing to the existence of nuclear tests in the atmosphere which introduced large amounts of isotopes into the atmosphere after this date. The 1950 reference corresponds to a pMC value of 100. Given the thermonuclear tests, the current value to be retained is approximately 107.5 (which corresponds to a correction factor of 0.93). The ratioactive carbon signature of a current plant is therefore 107.5. A signature of 54 pMC and a signature of 99 pMC therefore correspond to an amount of biomaterial in the sample of 50% and of 93%, respectively.

Standard ASTM D 6866 proposes three techniques for measuring the $^{14}C$ isotope content:

LSC (Liquid Scintillation Counting). This technique consists in counting the "beta" particles derived from the disintegration of $^{14}C$. The beta radiation derived from a sample of known mass (known number of C atoms) is measured for a certain period of time. This "radioactivity" is proportional to the number of $^{14}C$ atoms, which can thus be determined. The $^{14}C$ present in the sample emits β-radiation, which, in contact with the liquid scintillant (scintillator), gives rise to photons. These photons have different energies (between 0 and 156 keV) and form what is known as a $^{14}C$ spectrum. According to two variants of this method, the analysis relates either to the $CO_2$ produced beforehand by the carbonaceous sample in a suitable absorbent solution, or to benzene, after prior conversion of the carbonaceous sample to benzene. Standard ASTM D 6866 therefore provides two methods A and C, based on this LSC method.

AMS/IRMS (Accelerated Mass Spectrometry coupled with Isotope Radio Mass Spectrometry). This technique is based on mass spectrometry. The sample is reduced to graphite or to $CO_2$ gas, and analyzed in a mass spectrometer. This technique uses an accelerator and a mass spectrometer to separate the $^{44}C$ ions from the $^{42}C$ ions and therefore to determine the ratio of the two isotopes.

The copolymer alloys according to the invention originate at least partially from biomaterial and therefore have a biomaterial content of at least 1%, which corresponds to a $^{14}C$ content of at least $1.2\times10^{-14}$. This content is advantageously higher, in particular up to 100%, which corresponds to a $^{14}C$ content of $1.2\times10^{-12}$. The alloys according to the invention may therefore comprise 100% of biocarbon or, on the contrary, result from a mixture with a fossil origin. A subject of the present invention is also the use of a block copolymer alloy according to the invention in a thermoplastic polymer matrix for improving the antistatic properties of said matrix. Said polymer matrix comprises at least one thermoplastic polymer, which is a homopolymer or copolymer, chosen from: polyolefins, polyamides, fluoropolymers, saturated polyesters, polycarbonate, styrene resins, PMMA, thermoplastic polyurethanes (TPUs), copolymers of ethylene and of vinyl acetate (EVA), copolymers comprising polyamide blocks and polyether blocks, copolymers comprising polyester blocks and polyether blocks, copolymers comprising polyamide blocks, comprising polyether blocks and comprising polyester blocks, copolymers of ethylene and of an alkyl (meth)acrylate, copolymers of ethylene and of vinyl alcohol (EVOH), of ABS, of SAN, of ASA, of polyacetal, polyketones, and mixtures thereof.

A subject of the present invention is also a composition comprising from 1% to 40% by weight of at least one block copolymer alloy according to the invention and from 60% to 99% by weight of a polymer matrix as defined above, relative to the total weight of the composition.

Preferably, the composition according to the present invention comprises from 10% to 30% by weight of at least one block copolymer alloy according to the invention and from 70% to 90% by weight of a polymer matrix as defined above, relative to the total weight of the composition.

The compositions of the invention have improved antistatic properties owing to the decrease in surface resistivity provided by the incorporation of at least one block copolymer alloy according to the invention into at least one part of a polymer matrix as defined above. The addition of said at least one copolymer alloy to said matrix can be carried out by any processes well known to those skilled in the art in the polymer field, in particular by dry mixing, or by kneading at a temperature above the glass transition temperature of the various polymers added, or by shearing at a temperature substantially equal to the fluidization temperature of the various polymers added, in particular by calendaring, by extrusion, or else by mixing in solution.

EXAMPLES

The examples below illustrate the present invention without limiting the scope thereof. In the examples, unless otherwise indicated, all the percentages and parts are expressed by weight.

Products used in the examples:
PEG 1500: dihydroxy poly(ethylene glycol) of Mn=1500 g/mol.
Organic Salts:
LI1: 1-ethyl-3-methylimidazoliumbis(trifluoromethane-sulfonyl)imide
LI2: 1-ethyl-3-methylimidazolium methanesulfonate
LI3: N-trimethyl-N-butylammoniumbis(trifluoromethane-sulfonyl)imide Synthesis of a PA12 Block of Molar Mass Close to 1500 g/mol 4300 g of lactam 12 and 464 g of adipic acid are charged, with 300 g of water, to an autoclave. The temperature of the reaction medium is brought to 280° C. over the course of approximately 2 h 15, and then a hold of 3 h at 280° C. is performed. A pressure reduction is then applied so as to return to atmospheric pressure over the course of approximately 1 h 25, and then sweeping under nitrogen is carried out for 2 h, before extrusion of the block. An analysis of the COOH chain ends indicates that the molar mass Mn of the block is 1560 g/mol.

Synthesis of a PA12 Block of Molar Mass 2000 g/mol 4500 g of lactam 12 and 355 g of adipic acid are charged, with 340 g of water, to an autoclave. The temperature of the reaction medium is brought to 280° C. over the course of approximately 2 h 10, and then a hold of 3 h at 280° C. is performed. A pressure reduction is then applied so as to return to atmospheric pressure over the course of approximately 1 h 20, and then sweeping under nitrogen is carried out for 2 h, before extrusion of the block. An analysis of the COOH chain ends indicates that the molar mass Mn of the block is 2000 g/mol.

Synthesis of the PA 6/12 Block (COPA 1)

300 g of lactam 6, 1200 g of lactam 12 and 190 g of adipic acid are charged, with 127 g of water, to an autoclave. The temperature of the reaction medium is brought to 280° C. over the course of approximately 1 h 40, and then a hold of 2 h at 280° C. and under a pressure of 21 bar is performed. A pressure reduction is then applied so as to return to atmospheric pressure over the course of approximately 1 h, and then sweeping under nitrogen is carried out for 50 min, before extrusion of the block. An analysis of the COOH chain ends indicates that the molar mass Mn of the block is 1430 g/mol.

Synthesis of the PA 6/12 Block in the Presence of LI2 (COPA 2): Incorporation of LI2 During Step I:

264 g of lactam 6, 1056 of lactam 12, 167.2 g of adipic acid and 32.7 g of LI2 are charged, with 112 g of water, to an autoclave. The temperature of the reaction medium is brought to 280° C. over the course of approximately 1 h 30, and then a hold of 2 h at 280° C. and under a pressure of 19.5 bar is performed. A pressure reduction is then applied so as to return to atmospheric pressure over the course of approximately 1 h 10, and then sweeping under nitrogen is carried out for 50 min, before extrusion of the block. An analysis of the COOH chain ends indicates that the molar mass Mn of the block is 1325 g/mol.

Example 1

30 g of the PA12 block prepared above and 30 of PEG (1500 g/mol) are introduced into a glass reaction vessel equipped with an anchor stirrer. The reaction medium is made inert by sweeping under nitrogen for 10 min. The whole is placed in an oil bath in order to reach a material temperature of approximately 240° C. (+/−5° C.). Once the mixture has completely melted, the stirring is begun. After 1 h of sweeping under nitrogen, 0.608 g of LI1 is introduced into the reaction medium (for example via a syringe). The pressure in the reaction vessel is then reduced so as to reach 2 mbar, and then 0.3% by weight of $Zr(OBu)_4$ is added via injection with a syringe of a concentrated solution in toluene. The stirring is fixed at 250 rpm. The torque reaches 20 N·cm after approximately 10 minutes following the placing under vacuum.

Comparative Example 1

A test is then carried out using the same process as for example 1, by introducing the same amounts of PA12 (1500 g/mol) and of PEG (1500 g/mol), but without adding any other starting materials. The torque reaches 20 N·cm after approximately 18 min following the placing under vacuum.

Example 2

A test is then carried out using the same process as for example 1, by introducing the same amounts of PA12 and of PEG 1500, but using 0.304 g of LI1. The torque reaches 20 N·cm after approximately 15 min following the placing under vacuum.

Example 3

A test is then carried out using the same process as for example 1, by introducing the same amounts of PA12 and of PEG 1500, but using 1.52 g of LI1. The torque reaches 20 N·cm after approximately 15 min following the placing under vacuum.

Example 4

A test is then carried out using the same process as for example 1, by introducing the same amounts of PA12 and of PEG 1500, but using 0.62 g of LI2. The torque reaches 20 N·cm after 13 min.

In examples 1 to 4, the viscosity (corresponding to the torque 20 N·cm) of the copolymer alloy is reached much more rapidly by virtue of the addition of an organic salt during polycondensation step II for obtaining the block copolymer (step II). The addition of an organic salt according to the process of the invention (examples 1-4) during step II accelerates the reaction kinetics for polymerization between the PA block and the PEG block, compared with the same polymerization reaction without the addition of an organic salt (comparative 1).

Comparative 9

A test is then carried out using the same process as for comparative example 1, by introducing 30 g of CoPA1 and 31.5 g of PEG 1500, without the addition of an organic salt. The torque reaches 20 N·cm after approximately 66 min following the placing under vacuum.

Example 13

A test is then carried out using the same process as for example 1, by introducing 30 g of PA12, 30 g of PEG 1500 and 0.572 g of LI1. The torque reaches 20 N·cm after approximately 10 min following the placing under vacuum.

Example 14

A test is then carried out using the same process as for example 1, by introducing 30 g of PA12, 30 g of PEG 1500 and 0.572 g of LI3. The torque reaches 20 N·cm after approximately 13 min following the placing under vacuum.

The addition of an organic salt according to the process of the invention (examples 13 and 14) during step II accelerates the reaction kinetics for polymerization between the PA block and the PEG block, compared with the same polymerization reaction without the addition of an organic salt (comparative 9).

Examples 5-7

The following table 1 indicates the surface resistivity in ohms/square of examples 5 to 7 according to the invention, compared with comparative examples 1 to 5 not in accordance with the invention. In example 5, an alloy is prepared according to the same procedure as examples 1 to 4, but using 1% by weight of LI1 relative to the total weight (block copolymer+organic salt).

The surface resistivity of, respectively, polyethylene PE (comparative 2) and polystyrene PS (comparative 4) matrices is decreased by at least a factor of 10 by incorporation of 20% by weight of block copolymer (PA12-PEG), relative to the total weight of the composition in comparative examples 3 and 5, respectively.

The surface resistivity of, respectively, polyethylene PE (comparative 2) and polystyrene PS (comparative 4) matrices is decreased by at least a factor of $10^3$ by incorporation of 20% by weight of a mixture (99% block copolymer PA12-PEG+1% LI1), relative to the total weight of the composition in examples 6 and 7 according to the invention.

Comparative Example 10

A test is then carried out using the same process as for comparative example 1, by introducing 30 g of PA12 of mass 2000 g/mol and 30 g of PTMG 2000.

Example 15

A test is then carried out using the same process as for example 1, by introducing 30 g of PA12 of mass 2000 g/mol, 30 g of PTMG 2000 and 0.608 g of LI1.

In example 15, for a PTMG-based polyether-block copolymer, the resistivity is effectively decreased (by at least a factor of $10^3$) by adding an organic salt (1% LI1), compared with comparative example 10.

TABLE 1

| | Composition (% by weight) | | | Surface resistivity (ohms/square) |
|---|---|---|---|---|
| | Block copolymer | Organic salt | Matrix | |
| Comparative 1 | 100% PA12-PEG | | | $10^9$ |
| Example 5 | 99% PA12-PEG | 1% LI1 | | $10^7$ |
| Comparative 2 | | | 100% PE | $10^{14}$ |
| Comparative 3 | 20% PA12-PEG | | 80% PE | $10^{13}$ |
| Example 6 | 20% (99% PA12-PEG) | 20% (1% LI1) | 80% PE | $10^{11}$ |
| Comparative 4 | | | 100% PS | $10^{14}$ |
| Comparative 5 | 20% PA12-PEG | | 80% PS | $10^{11}$ |
| Example 7 | 20% (99% PA12-PEG) | 20% (1% LI1) | 80% PS | $10^9$ |
| Comparative 10 | 100% PA12-PTMG | | | >$10^{12}$ |
| Example 15 | 99% PA12-PTMG | 1% LI1 | | $10^9$ |

Examples 8-11

In the following table 2, the PEG block has a molar mass of 1500 g/mol. The PA 6/12 block has a molar mass of 1500 g/mol.

The matrix in comparative examples 7 and 8 and examples and 10 is an acrylonitrile/butadiene/styrene (ABS) terpolymer of Magnum 3453 MFI14 grade (Dow).

TABLE 2

| | Composition (% by weight) | | | Surface resistivity (ohms/square) |
|---|---|---|---|---|
| | Block copolymer | Organic salt | Matrix | |
| Comparative 6 | 100% PA6/12-PEG | | | $10^9$ |
| Comparative 7 | | | 100% ABS | $10^{13}$ |
| Comparative 8 | 20% PA6/12-PEG | | 80% ABS | $10^{10}$ |
| Example 8 | 99% PA6/12-PEG | 1% LI2 step I | | $10^{7.8}$ |
| Example 9 | 20% (99% PA6/12-PEG + 1% LI2 step I) | | 80% ABS | $10^{9.8}$ |
| Example 10 | 99% PA6/12-PEG | 1% LI2 step II | | $10^{7.4}$ |
| Example 11 | 20% (99% PA6/12-PEG + 1% LI2 step II) | | 80% ABS | $10^8$ |
| Example 16 | 99% PA6/12-PEG | 1% LI2 step III | | $10^7$ |
| Example 17 | 20% (99% PA6/12-PEG + 1% LI2 step III) | | 80% ABS | $10^8$ |

The surface resistivity of the ABS (comparative 7) is decreased by a factor of $10^3$ in comparative example 8 which incorporates 20% by weight of a PA6/12-PEG block copolymer.

Example 8 (Incorporation of LI in step I)

A test is then carried out using the same process as for comparative example 1, by introducing 30 g of CoPA2 and 33.9 g of PEG 1500.

Example 10 (Incorporation of LI in Step II)

A test is then carried out using the same process as for example 1, by introducing 30 g of CoPA1, 31.5 g of PEG 1500 and 0.6235 g of LI2. The torque reaches 20 N·cm after approximately 45 min following the placing under vacuum.

Example 16 (Incorporation of LI in Step III)

A test is then carried out by introducing 29.7 g of product resulting from comparative example 9 with 0.3 g of LI2 into a mixer which is rotated under vacuum at 60° C. for 8 h.

The surface resistivity of a PA6/12-PEG block copolymer (comparative 6) is decreased by at least a factor of $10^2$ by incorporation of an organic salt LI2 during step I of production of the PA6/12 block (example 8 according to the invention), or else during polycondensation step II for obtaining a PA6/12-PEG block copolymer (example 10 according to the invention), or else during step III for recovering the copolymer alloy (example 16 according to the invention).

The surface resistivity of the ABS (comparative 7) is decreased by at least a factor of $10^3$ in example 9. This example 9 according to the invention is a composition comprising 20% of a copolymer alloy according to the invention (example 8) incorporated by compounding into 80% of ABS matrix. In example 9, said PA6/12-PEG copolymer alloy comprises 1% of LI2 incorporated during step I of the process of the invention.

The surface resistivity of the ABS (comparative 7) is decreased by a factor of $10^5$ in example 11. This example 11 according to the invention is a composition comprising 20% of a copolymer alloy according to the invention (example 10) incorporated by compounding into 80% of ABS matrix. In example 11, said PA6/12-PEG copolymer alloy comprises 1% of LI2 incorporated during step II of the process of the invention.

The incorporation of an organic salt, in particular during step II of the process of the invention, not only accelerates the reaction kinetics for polymerization between the PA block and the flexible (in this case polyether) block, but also more effectively decreases the resistivity of the copolymer alloy obtained according to the invention and more effectively decreases the resistivity of a polymer matrix incorporating it, compared with the incorporation of an organic salt during step I of the process of the invention.

The surface resistivity of the ABS (comparative 7) is decreased by a factor of $10^5$ in example 17. This example 17 according to the invention is a composition comprising 20% of a copolymer alloy according to the invention (example 16) incorporated by compounding into 80% of ABS matrix. In example 9, said PA6/12-PEG copolymer alloy comprises 1% of LI2 incorporated during step I of the process of the invention.

Regardless of the step at which the organic salt is incorporated in the process of the invention, the antistatic effect of the Pebax thus "doped" with an organic salt is increased ten-fold compared with the effect of Pebax alone.

Mechanical and Physicochemical Properties of the Copolymers According to the Invention:

The following table 3 shows the results of DMA analyses carried out using a TA DMA Q800 thermal analysis instrument: measurement in the tensile mode at 1 Hz and a ramp of 3° C./min. The blocks of the PA6/12-PEG used have a molar mass respectively of: 1430-1500 g/mol.

TABLE 3

| Composition | Tg ° C. (taken at the max of E") | Modulus E' (23° C.) |
|---|---|---|
| PA6/12-PEG | −45° C. | 70 MPa |
| PA6/12-PEG + 1% LI2 (example 8) | −45° C. | 70 MPa |
| PA6/12-PEG + 1% LI2 (example 10) | −45° C. | 70 MPa |
| PA6/12-PEG + 1% LI2 (example 16) | −45° C. | 70 MPa |

The incorporation of an organic salt according to the process of the invention (regardless of the step of incorporation: I, II or III for, respectively, examples 8, 10 or 16) makes it possible to obtain a copolymer alloy having the same mechanical properties (modulus, Tg) as those of the copolymer alone, i.e. without the addition of an organic salt.

The invention claimed is:

1. A process for synthesizing an alloy based on a block copolymer comprising at least one rigid polyamide block PA, comprising the following steps:
   I—producing at least one polyamide block PA that comprises at least one of PA12 or PA6/12;
   II—polycondensing at least one soft block SB having a glass transition temperature Tg below 15° C., which at least one soft block comprises a polyether block having at least 50% by weight of PEG, relative to the total weight of polyether block(s), with said at least one polyamide block PA so as to obtain a block copolymer; and
   III—recovering said block copolymer alloy,
   and comprising adding, during II, 0.1% to 30% by weight of at least one organic salt in molten state, relative to the total weight of alloy; which salt has at least one cation comprising at least one of the following molecules: ammonium, sulfonium, pyridinium, imidazolium, imidazolinium, or mixtures thereof, and
      an anion which is bis(trifluoromethanesulfonyl)imide, tetrafluoroborate, trifluoroacetate, methanesulfonate, trifluoromethanesulfonate, ethyl sulfate, hydrogen sulfate, or mixtures thereof,
      such that the alloy obtained has improved antistatic properties and identical mechanical properties compared with the same copolymer produced without adding an organic salt,
   wherein said at least one organic salt comprises at least one anion comprising at least one of the following molecules: imides, borates, phosphates, phosphinates phosphonates, amides, halides, cyanates; acetates, sulfonates, sulfates, or mixtures thereof, and
   whereby the use of an organic salt in the molten state synthesizing the alloy based on a block copolymer comprising at least one polyamide block PA, accelerates the reaction kinetics of said polymerization between the PA blocks and the soft blocks.

2. The process as claimed in claim 1, in which III comprises the following substeps:
   III-1—adjustment of the viscosity of the copolymer alloy,
   III-2—extrusion of the copolymer alloy, and
      optionally:
   III-3—stoving of the alloy.

3. The process as claimed in claim 1, in which the organic salt is added by means of an impregnation liquid containing the organic salt pure or diluted in a solvent.

4. The process as claimed in claim 1, in which said step I comprises the polycondensation of polyamide precursors in the presence of a chain regulator.

5. The process as claimed in claim 1, in which steps I and II are carried out simultaneously.

6. The process as claimed in claim 1, also comprising the addition of agents which increase surface conductivity, during step I, II and/or III, said agents being hygroscopic agents; fatty acids; lubricants; metals; metal film coatings; metal powders; metal nanopowders; aluminosilicates; amines; esters; fibers; carbon black; carbon fibers; carbon nanotubes; polyethylene glycol; intrinsically conductive polymers; masterbatches; or mixtures thereof.

7. The process as claimed in claim 1, also comprising the addition of additives and/or adjuvants during step I, II and/or III, said additives and/or adjuvants being chosen from: organic or inorganic fillers, reinforcing agents, plasticizers, stabilizers, antioxidants, anti-UV agents, flame retardants, carbon black, carbon nanotubes; mineral or organic dyes, pigments, dyes, demolding agents, lubricants, foaming agents, anti-impact agents, shrink-proofing agents, fire-retardants, nucleating agents, and mixtures thereof.

* * * * *